Figure 1A:
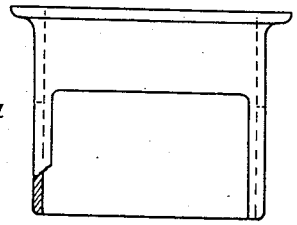

July 4, 1939.    M. BRINCK ET AL    2,164,695
ADJUSTING DEVICE FOR PHOTOGRAPHIC AND CINEMATOGRAPHIC OBJECTIVES
Filed Feb. 7, 1938    3 Sheets-Sheet 1

INVENTORS:
Max BRINCK and Willi GRÖNEBAUM
by Kurt H Feist
their Attorney.

July 4, 1939.  M. BRINCK ET AL  2,164,695
ADJUSTING DEVICE FOR PHOTOGRAPHIC AND CINEMATOGRAPHIC OBJECTIVES
Filed Feb. 7, 1938  3 Sheets-Sheet 2
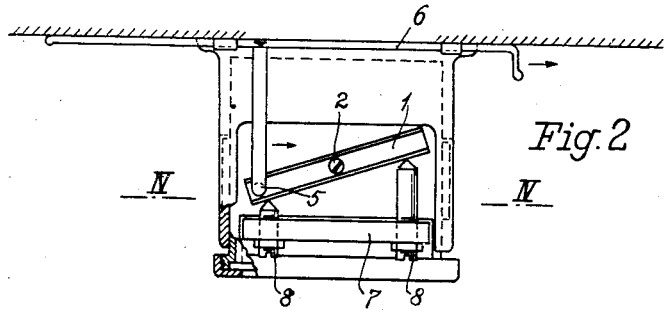
Fig. 2
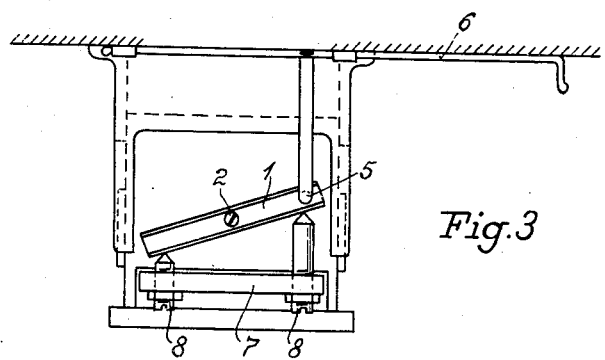
Fig. 3
Fig. 4
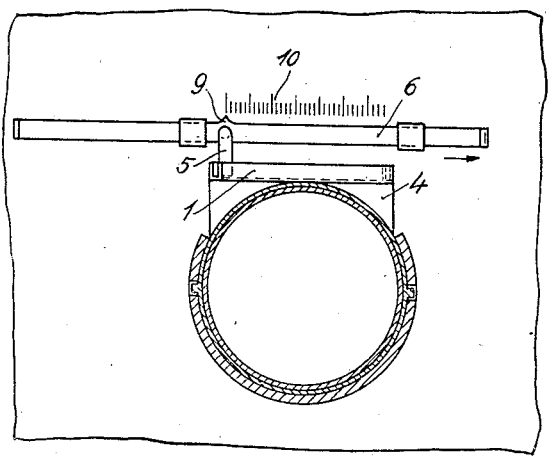
Fig. 5
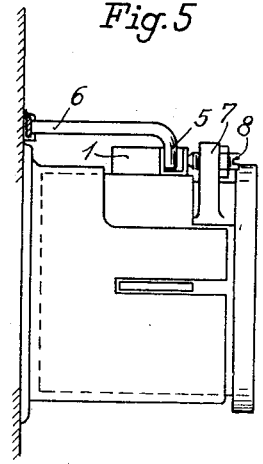
INVENTORS:
Max BRINCK and Willi GRÖNEBAUM
Their Attorney.

July 4, 1939.  M. BRINCK ET AL  2,164,695
ADJUSTING DEVICE FOR PHOTOGRAPHIC AND CINEMATOGRAPHIC OBJECTIVES
Filed Feb. 7, 1938    3 Sheets-Sheet 3
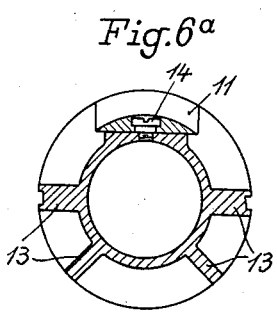
Fig.6ᵃ
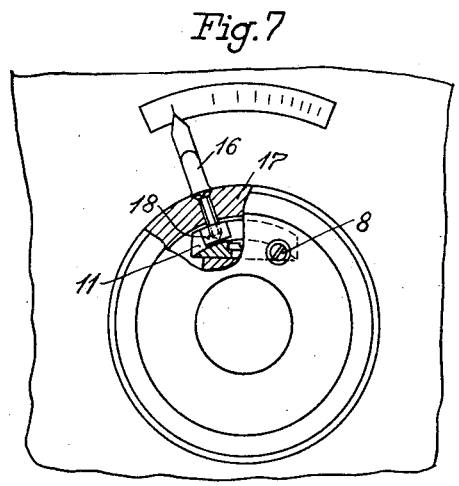
Fig.7
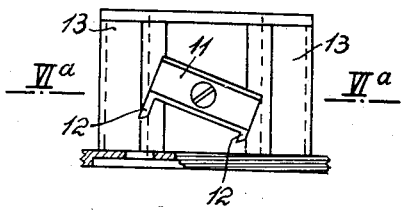
Fig.6ᵇ
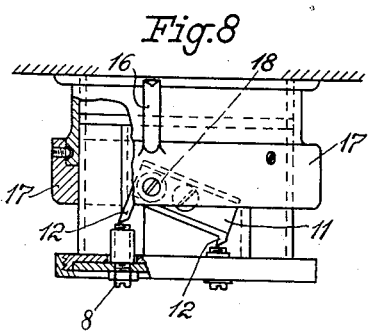
Fig.8
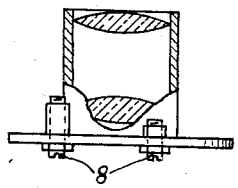
Fig.6ᶜ
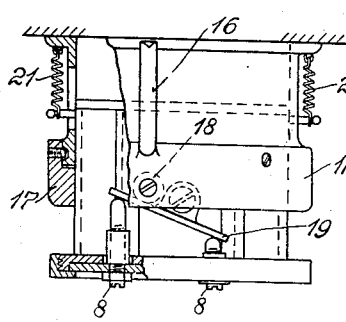
Fig.9
INVENTORS:
Max BRINCK and Willi GRÖNEBAUM
by
their Attorney.

Patented July 4, 1939

2,164,695

UNITED STATES PATENT OFFICE 2,164,695

ADJUSTING DEVICE FOR PHOTOGRAPHIC AND CINEMATOGRAPHIC OBJECTIVES

Max Brinck, Berlin-Steglitz, and Willi Grönebaum, Berlin-Wilmersdorf, Germany, assignors to the firm Tobis Tonbild Syndikat Aktiengesellschaft, Berlin, Germany, a company of Germany Application February 7, 1938, Serial No. 189,086
In Germany February 9, 1937

6 Claims. (Cl. 95—45)

The invention relates to a universal mounting for objectives for photographic and cinematographic apparatus.

The photographic requirements which are made today in the advanced state of the photographic and cinematographic art, render it necessary that use should be made of all technical auxiliary devices which are at the disposal of the operator. In this connection also it is relevant that all exposures cannot be made with one and the same objective, but according to the existing conditions different objectives must be used. In order to avoid using another complete exposure apparatus with a corresponding objective, each time, which on economic grounds alone would not be feasible, the objectives have been made exchangeable, so that one and the same apparatus can be equipped with different optical systems. In the further development of this idea the so-called objective sets were developed, i. e., objectives with different properties, which have uniform exteriors and which all fit in the objective ring on the exposure apparatus, so that a simple and rapid exchange of one objective for another is possible.

This procedure has the disadvantage that no single scale for adjustment of the focussing of the picture can be mounted on the exposure apparatus since a different distance scale corresponds to each objective. In many of the usual photographic cameras and in practically all cinematographic cameras the adjustment of focus is carried out by displacement of the objective, whereby by guiding along a screw thread path, a movement of the objective in the direction of the optical axis is effected. According to the inclination of the screw thread path the displacement will be greater or less for the same angular movement. It is apparent that a device for adjustment of focus connected with the apparatus itself can only be correct for one and the same objective.

Attempts have been made to remove this disadvantage, whereby the device for focus adjustment is not rigidly connected with the camera, but with each individual objective, a spiral guide appropriate for the objective, is connected, so that when this spiral guide comes into engagement with adjusting lever on the camera, the adjustment scale is correct for each objective. The inclination of the spiral shaped guide is accordingly different for each objective and is fixed for that objective. This means however, that for each objective, an accurately fitted guide must be produced, whereby relatively high expenses occur in the production and the further attention. A further disadvantage of this method consists in that the accuracy in the case of the strong light objectives with large aperture employed today is no longer sufficient since the fitting can no longer be maintained with sufficient accuracy between the driving part of the adjusting lever and the spiral guide.

The disadvantages described are avoided in the objective mounting according to the invention. The principle of the invention consists in that the movement of the objective in the direction of the optical axis is not effected on the objective itself, but, that the movement device acts on an intermediate member, for example an intermediate sleeve, continually connected with the camera, and that on the objective itself devices are provided which in the manner of a stencil control the degree of the movement upon insertion of the objective into the intermediate member.

In the drawings the basic idea of the invention is illustrated in a few embodiments by way of example.

Figure 1B:
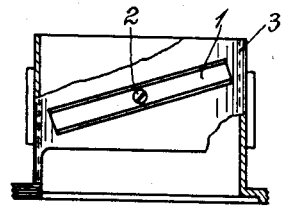
Figure 1C:
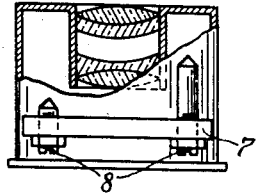
Figure 1D:

In the accompanying drawings:

Figure 1a shows the tube shaped mounting part rigidly connected with the camera, Figure 1b the intermediate member, which fits exactly into and is insertable into the part 1a and is secured against rotating, with the variable adjustable guide rail, Figure 1c the actual objective part with the adjusting device for the guiding rail, Figure 1d a mounting ring for ensuring the rigid connection between the parts 1b and 1c, Figure 2 the parts shown separated in Figures 1a–1d combined together, seen in plan, Figure 3 the same mounting as in Figure 2 but at another distance adjustment, seen in plan, Figure 4 the same mounting seen in front elevation, Figure 5 a side view of the mounting, Figures 6a, 6b, 6c, a modified embodiment of the invention, Figure 7 a view of the objective 6a to 6c in front elevation, Figure 8 a view of the same objective in plan and Figure 9 a modified embodiment of the invention.

A tube shaped mounting part (Figure 1a) as well as a distance scale with an adjustable lever (not shown in Figure 1a) is as usual rigidly connected with the photographic or cinematographic camera. An intermediate member 1b fitting exactly, and secured against rotating (for example by slot and pin) may be inserted into this tubular member. The intermediate member carries the guiding rail 1 which serves for the actual distance adjustment, which rail is rotatably mounted about the middle pin 2. In order that the guide rail, upon rotation, may have a good bearing surface, the tubular member 3 is provided with a corresponding extension 4 (Figure 4), which has a plane surface. In the position ready for use the part 1b is pushed into the mounting 1a and thus the driving member 5 (Figures 2, 3, 4 and 5) of the adjusting lever 6 engages in the guide rail so that upon pushing the adjusting lever, the driving member 5 slides, fitting exactly in the rail 1. According to the angular position of the rail, a displacement of the intermediate part 1b in the direction of the optical axis takes place.

It is apparent that by this device the whole mechanism for displacing or adjusting the objective only requires to be present once, which again has the advantage that all parts can be adjusted very exactly and that the attention to these parts is relatively simple. In the case of wear the exchanging of the defective part for a new one is easy and may be effected without great expense.

The different objectives are now carried in a common mounting, which fits exactly into the intermediate member 1b. If the desired objective is inserted it is maintained in its position by screwing up the retaining ring 1d. Each objective has, according to the invention, a device which upon insertion of the objective automatically undertakes control of the adjustment mechanism, in such a manner that the adjustment scale agrees with the objective in use at the time. The device can for example consist in a projection 7 (Figures 1c, 2, 3, and 5) which carries two engaging pins. Upon insertion of the objective into the movable mounting the engaging pins abut against the rotatable rail 1 and give this an angular position, as is exactly necessary for this objective. It is apparent that only by correct measurement of the two engaging pins 8 and thus by the corresponding angular position of the guide rail in each case can a co-ordination with the adjusting lever and its scale be attained. Likewise obviously the length of the engaging pins 8 must be suited to the focal length of the objective being used.

Whilst for better clarity the adjusting lever in the previously described embodiment is formed as a movable rod 6, the pointer 9 of which moves over a scale 10, an embodiment is illustrated in Figures 6–8 which is more practical and in which the adjusting lever is rotatably arranged. The Figures 6b and 6c correspond to the Figures 1b and 1c. The objective 6c again exactly fits into the intermediate member 6b, whereby the engaging pins 8 again cause the correct angular positioning of the guiding rail 11. As a possible alteration in the embodiment the guiding rail 11 here possesses two lugs 12, which contact with the hardened surface of the engaging pins 8. Also the intermediate member 6b has in this example an altered shape in contradistinction to the Figure 1b, the intermediate member is not formed as a round tube but has a few ribs 13 (in Figure 6a) with which it fits movably into the camera mounting, prevented however from rotary movement. Also in this example the intermediate member again has a machined surface on which the guiding rail 11 is rotatably mounted about the pin 14c. The adjusting lever 16 (in Figure 7) is in this modification fixed to the ring 17 (Figures 7 and 8), which is also rotatably mounted. The adjusting lever 16 or the ring 17 are connected with the driving member 18 (Figures 7 and 8) which engages in the rail 11.

The examples described only illustrate possible modifications of the inventive idea. These examples can obviously be widely altered in practice.

Thus it is for example possible, to use a simple rail 19, as in Figure 9, along which the driving member of the adjustment lever slides, instead of a V-shaped guide rail. Since in this case no compulsory guide is present, springs 21 are provided which bring the intermediate member and therewith the rail 19 continually into driving contact with the adjusting lever 20. Likewise the most varied modifications of the engaging pins; which bring about the adjustment of the guiding rail, are possible. These various modifications obviously fall within the invention, the basic idea of which consists in that the individual exchangeable objectives only contain adjustable parts which upon insertion of the objective into the pertaining mounting so adjust a guide connected with the adjusting lever, that the same scale with the distance markings is suitable for all objectives.

We claim:

1. In a photographic or cinematographic camera, a mount attached to said camera, an intermediate member, said intermediate member being in movable engagement with said mount, an objective adapted to be connected to said intermediate member, means for securing the relative position between said objective and said intermediate member, adjustable controlling means mounted on said intermediate member, adjusting means secured to said objective for adjusting said controlling means according to the focal length of the objective, said adjusting means being in engagement with said controlling means when the objective is connected to said intermediate member, and focusing means arranged on said camera, said focusing means being in engagement with said controlling member.

2. In a photographic or cinematographic camera, a mount attached to said camera, an intermediate member, said intermediate member being in movable engagement with said mount, an objective adapted to be connected to said intermediate member, means for securing the relative position between said objective and said intermediate member, adjustable controlling means mounted on said intermediate member, adjusting means secured to said objective for adjusting said controlling means according to the focal length of the objective, said adjusting means being in engagement with said controlling means when the objective is connected to said intermediate member, a focusing member movably mounted on said camera, said focusing member being in engagement with said controlling member, an index secured to said focusing member, and a scale of distances carried by said camera and cooperating with said index.

3. In a photographic or cinematographic camera, a mount attached to said camera, an intermediate member adapted to slide without rotating inside said mount, an objective adapted to be inserted into said intermediate member, means for rigidly connecting said objective with said intermediate member, a controlling guiding member pivotally mounted on said intermediate member, adjusting means secured to said objective for adjusting said guiding member in a position inclined to the axis of said intermediate member according to the focal length of the objective, said adjusting means being in engagement with said guiding member and holding same in its inclined position when the objective is inserted into said intermediate member, and a focusing member movably mounted on said camera, said focusing member being in engagement with said controlling guiding member for imparting an axial movement to said intermediate member carrying said objective.

4. A photographic or cinematographic camera as claimed in claim 3, in which said controlling guiding member is provided with a groove and a projection arranged on said focusing member is in engagement with said groove.

5. A photographic or cinematographic camera as claimed in claim 3, said controlling guiding member consisting of a rail, and resilient means, said resilient means acting on said rail to urge same against said focusing member being in contact therewith.

6. A photographic or cinematographic camera as claimed in claim 3, in which said adjusting means consist of a plurality of adjusting pins of different length.

WILLI GRÖNEBAUM.
MAX BRINCK.